UNITED STATES PATENT OFFICE.

ROBERT GANS, OF PANKOW, NEAR BERLIN, GERMANY, ASSIGNOR TO J. D. RIEDEL AKTIENGESELLSCHAFT, OF BERLIN, GERMANY, A JOINT STOCK COMPANY.

PROCESS FOR CLARIFYING WATER AND PURIFYING IT FROM GERMS.

1,082,315. Specification of Letters Patent. Patented Dec. 23, 1913.

No Drawing. Application filed December 12, 1910. Serial No. 596,884.

*To all whom it may concern:*

Be it known that I, Dr. ROBERT GANS, a subject of the German Emperor, residing at Pankow, near Berlin, Germany, have invented a certain new and useful Process for Clarifying Water and for Purifying it from Germs, of which the following is a specification.

It is known, that water can be relieved of inorganic and organic matter and also organic germs, by producing precipitates in the water to be purified, by means of suitable additions, such as sulfate of alumina, which acts on the water either alone or with the aid of lime, so as to form precipitates, which envelop the bodies held in suspension and the germs, so that a clear water free from germs may be obtained by filtration. This treatment, however, has the defect, that only a low speed of filtration (about 4 meters per hour) may be used, that with a higher speed of filtration the precipitate is forced through the filter, that the filter is rapidly clogged by the voluminous precipitate, so that it has to be rinsed after about 6 hours, and that in the case of soft water the addition of lime will increase the hardness of the water. As a matter of fact, water may be sterilized, either by filtration over oxidized oxids of manganese in conjunction with natural or artificial zeolites, or after the addition of permanganates in excess, over reduced oxids of manganese in conjunction with natural or artificial zeolites. In the first case, however, sterilization is produced without sufficient clarification, and in the second case the addition of an excess of permanganate increases the expense of the process. All these evils may be avoided, where oxidized or reduced oxids of manganese without zeolites or in conjunction with zeolites are employed, by producing in the water to be clarified and sterilized a collodial solution of oxids of manganese, which by other methods of filtration are difficult to separate, which may be effected by adding to the water either permanganates alone but not in excess, or permanganates and manganous salts in any convenient order of succession. The separation of these oxids of manganese in the shape of flakes had better be avoided, and the formation of the collodial solution should therefore be effected only a short time before filtration. During the filtration through the oxidized or reduced oxids of manganese without zeolites or in conjunction with zeolites, however, the collodial oxids of manganese are removed in the shape of flakes with a high speed of filtration and carry the suspended matter and germs of the water along with them. These particles of oxids of manganese, which for the greatest part adhere firmly to the zeolite granules or other bodies coated with oxids of manganese, will not clog the filter, they are easily permeable for water and allow speeds of filtration of 25 meters and upward per hour. Moreover, the quantity of permanganate added is considerably less than with other methods.

Example I: In dealing with water containing manganese, a very small addition of permanganate to the water is sufficient, for instance water containing from 2 to 3 milligrams of manganous oxid per liter requires only the addition of about 0.6 milligrams of potassium permanganate per liter, but more or less may be used. This addition, which is theoretically sufficient for precipitating about 0.4 milligrams of manganous oxid, forms with the manganous salts of the water a colloidal solution, which can be easily removed by filtration over oxidized oxids of manganese without zeolites or in conjunction with zeolites, inasmuch as they form a deposit on the zeolites containing manganese. The filtered water is clear and free from germs.

In case the water does not contain any manganous oxid, about 1–2 milligrams or upward of manganous oxid are added and the process is carried out as above.

Example II: Water free from manganese may be converted into water containing manganese, by adding 0.5 to 5 milligrams or more of permanganate per liter, if as is mostly the case, the water contains reduced organic substances, which convert the permanganate partly into manganous salt and consequently into a colloidal solution. This addition is altogether insufficient for relieving the water of its germs by sterilization by the old method, which requires an excess of permanganate. The filtration takes place over reduced oxids of manganese. The addition of permanganate should take place shortly before filtration, in order to prevent a complete reduction of the permanganate. If it is desired, however, to accelerate the full reduction and with it the formation of the colloidal solution of manganese, the filtration may take place over oxidized oxids of manganese.

What I claim is:—

1. The process for clarifying water and for purifying it from germs, which consists in producing in the water a colloidal solution of manganese and then filtering it over an oxid of manganese, substantially as described.

2. The process for clarifying water and for purifying it from germs, which consists in producing in the water a colloidal solution of manganese by the addition of a permanganate and then filtering it over an oxid of manganese, substantially as described.

3. The process for clarifying water and for purifying it from germs, which consists in producing in the water a colloidal solution of manganese by the addition of a permanganate and a manganous salt and then filtering it over an oxid of manganese, substantially as described.

4. The process for clarifying water and for purifying it from germs, which consists in producing in the water a colloidal solution of manganese, and then filtering it over an oxidized oxid of manganese, substantially as described.

5. The process for clarifying water and for purifying it of germs, which consists in producing in the water a colloidal solution of manganese and then filtering over an oxid of manganese, in conjunction with zeolite, substantially as described.

6. The process for clarifying and sterilizing water, which consists in producing in the water a colloidal solution of manganese by the addition of a permanganate, and then passing it through a filtering medium consisting of an oxidized oxid of manganese and a zeolite, substantially as described.

In testimony whereof I have hereunto set my hand in presence of two subscribing witnesses.

Dr. ROBERT GANS.

Witnesses:
  HEINRICH KRIEGSHEIM,
  VELDEMER KRÜGER.